(12) United States Patent
Loganathan

(10) Patent No.: US 9,448,710 B2
(45) Date of Patent: *Sep. 20, 2016

(54) TRACKING USER INTERACTIONS WITH A MOBILE UI TO FACILITATE UI OPTIMIZATIONS

(71) Applicant: LinkedIn Corporation, Mountain View, CA (US)

(72) Inventor: Sivakumar Loganathan, San Carlos, CA (US)

(73) Assignee: LinkedIn Corporation, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/000,920

(22) Filed: Jan. 19, 2016

(65) Prior Publication Data

US 2016/0132229 A1   May 12, 2016

Related U.S. Application Data

(63) Continuation of application No. 14/162,526, filed on Jan. 23, 2014, now Pat. No. 9,323,448.

(51) Int. Cl.
| | |
|---|---|
| *G06F 3/0488* | (2013.01) |
| *G06F 3/0484* | (2013.01) |
| *H04L 29/08* | (2006.01) |
| *H04M 1/725* | (2006.01) |
| *G06F 9/44* | (2006.01) |
| *G06F 3/01* | (2006.01) |

(52) U.S. Cl.
CPC ......... *G06F 3/04847* (2013.01); *G06F 3/0488* (2013.01); *G06F 8/38* (2013.01); *H04L 67/22* (2013.01); *H04M 1/725* (2013.01); *G06F 3/017* (2013.01); *H04M 2250/22* (2013.01)

(58) Field of Classification Search
CPC ...... G06F 3/017; G06F 3/041; G06F 3/0481; G06F 3/04886
See application file for complete search history.

(56) References Cited

U.S. PATENT DOCUMENTS

| | | | |
|---|---|---|---|
| 6,809,726 B2 * | 10/2004 | Kavanagh | G06F 3/0418 178/18.01 |
| 8,823,667 B1 * | 9/2014 | Hill | G06F 3/041 345/173 |
| 2002/0130847 A1 * | 9/2002 | Conzola | G06F 3/0488 345/173 |
| 2002/0171677 A1 * | 11/2002 | Stanford-Clark | G06F 8/38 715/738 |

* cited by examiner

*Primary Examiner* — Alvin Tan
*Assistant Examiner* — Rinna Yi
(74) *Attorney, Agent, or Firm* — Park, Vaughan, Fleming & Dowler LLP

(57) ABSTRACT

The disclosed embodiments relate to an apparatus or system for tracking and analyzing user interactions with a mobile user interface (UI). During operation, the apparatus collects data while a user interacts with the mobile UI through a touchscreen, wherein the data includes tap-attempt data that specifies coordinates for touchscreen locations that the user has tapped while interacting with the mobile UI. Next, the apparatus compares the tap-attempt data with locations of tappable elements in the mobile UI, wherein each tappable element has an associated tap target size. For each tappable element, the apparatus uses results of the comparison to determine a percentage of tap attempts that have succeeded or failed for the associated tap target size. Finally, the apparatus makes the percentage information available to a UI designer to enable the UI designer to adjust tap target sizes for the mobile UI.

17 Claims, 7 Drawing Sheets
(1 of 7 Drawing Sheet(s) Filed in Color)

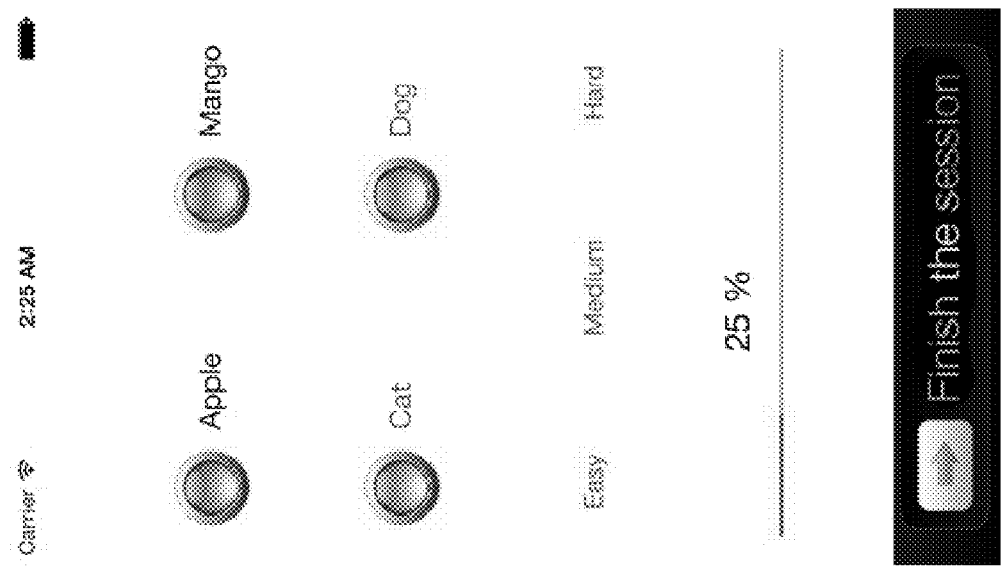
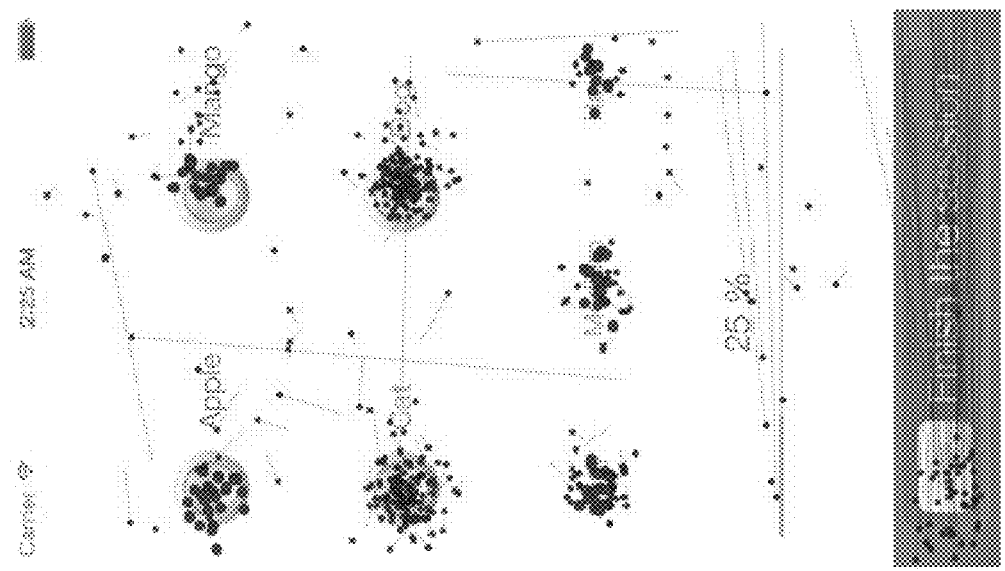
FIG. 7

Fix

| Easy | plus   minus   58 x 27 size would have 39% of failure.

FIG. 8

TRACKING USER INTERACTIONS WITH A MOBILE UI TO FACILITATE UI OPTIMIZATIONS

RELATED APPLICATION

This application is a continuation of and claims priority under 35 U.S.C. §120 to pending U.S. patent application Ser. No. 14/162,526, filed Jan. 23, 2014.

RELATED ART

The disclosed embodiments generally relate to the design of user interfaces (UIs) for mobile computing devices, such as smartphones. More specifically, the disclosed embodiments relate to techniques for tracking and analyzing user interactions with a mobile UI to facilitate optimizations to the mobile UI.

BACKGROUND

As mobile computing devices, such as smartphones and tablet computers, continue to proliferate, they are rapidly becoming the platform of choice for users who access online applications. However, the process of interacting with a mobile application can be challenging because mobile applications typically have a much smaller amount of screen real estate to work with than desktop applications, which makes it hard to display a large number of application control elements, such as buttons or sliders, to a user.

Moreover, users typically interact with these control elements by using a finger to tap or swipe associated regions on a touchscreen. However, a user's finger is a relatively blunt instrument in comparison to a cursor in a desktop user interface (UI). Hence, the targets for touchscreen taps or swipes need to be larger than corresponding targets for cursor selections in a desktop UI. This means that fewer control elements can be presented through a mobile application UI, because each control element takes up more screen real estate than a similar control element in a desktop UI.

The designer of a mobile UI needs to carefully size the "tap targets" for control elements. If a tap target is too small, a user who attempts to activate the tap target is likely to fail, which requires the user to try again and thereby degrades the user's experience. On the other hand, if the tap target is too large, the user may inadvertently activate the tap target, which also leads to an unsatisfactory user experience.

Hence, what is needed is a mechanism that helps a UI designer to determine the optimal size for a tap target.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 7 illustrates an exemplary mobile UI that is overlaid with associated tap attempts and swipe attempts in accordance with the disclosed embodiments.

FIG. 8 illustrates a tool that allows a UI designer to try various tap target sizes in accordance with the disclosed embodiments.

DESCRIPTION

Figure 1:
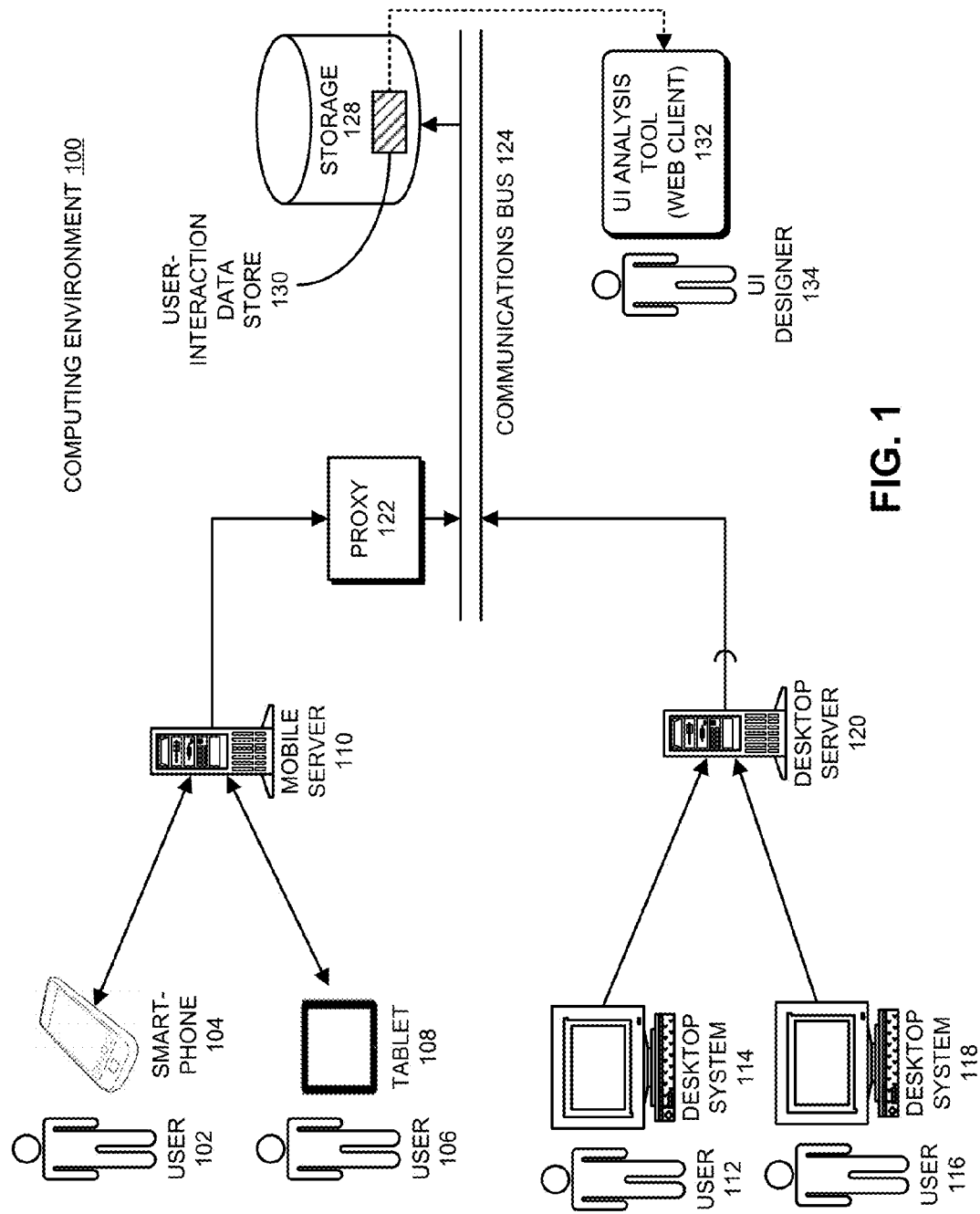
FIG. 1 illustrates a computing environment in accordance with the disclosed embodiments.

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computing device, system, or apparatus. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored on a non-transitory computer-readable storage medium as described above. When a device, system, or apparatus reads and executes the code and/or data stored on the non-transitory computer-readable storage medium, it performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments relate to a system (or an apparatus or device) for tracking user interactions with a mobile user interface (UI). During operation, the system collects data while a user interacts with the mobile UI through a touchscreen, wherein the data includes tap-attempt data that specifies coordinates for touchscreen locations that the user has tapped while interacting with the mobile UI. Next, the system compares the tap-attempt data with locations of tappable elements in the mobile UI, wherein each tappable element has an associated tap target size. (Note that the tap target size can be larger or smaller than the associated graphical image or icon that is used to represent the associated control element.) For each tappable element, the system uses results of the comparison to determine a percentage of tap attempts that have succeeded or failed for the associated tap target size. Finally, the system makes the percentage information available to a UI designer to enable the UI designer to adjust tap target sizes for the mobile UI.

Before describing how the system collects and analyzes tap attempts and other gestures, we first describe a computing environment in which the system operates.

Computing Environment

FIG. 1 illustrates an exemplary computing environment 100 in accordance with the disclosed embodiments. Note that the system illustrated in FIG. 1 gathers user-interaction data for mobile UIs that act as gateways to an online application from associated mobile devices, including a smartphone 104 and a tablet computer 108. (For example, this user-interaction data can include screen coordinates for tap attempts and other gestures as is described in more detail below.) The system can also gather user-interaction data for desktop UIs, such as browsers on desktop systems 114 and 118 that access a website associated with the online application.

More specifically, mobile devices 104 and 108, which are operated by users 102 and 106 respectively, execute mobile applications that function as portals to an online application, which is hosted on mobile server 110. Note that a mobile device can generally include any type of portable electronic device that can host a mobile application, including a smartphone, a tablet computer, a network-connected music player, a gaming console and possibly a laptop computer system.

Mobile devices 104 and 108 communicate with mobile server 110 through one or more networks (not shown), such as a Wi-Fi® network, a Bluetooth™ network or a cellular data network. During operation, the mobile applications send various types of user-interaction data (which are described in more detail below) to mobile server 110. Mobile server 110 in turn forwards this user-interaction data through a proxy 122 onto a communications bus 124. The user-interaction data is ultimately stored in a user-interaction data store 130 within storage system 128. Although the illustrated embodiment shows only two mobile devices, in general there can be a large number of mobile devices and associated mobile application instances (possibly thousands or millions) that simultaneously send user-interaction data through communications bus 124 to storage system 128.

In some embodiments, the user-interaction data is sent to mobile server 110 whenever it is generated. Alternatively, the user-interaction data can be aggregated on mobile devices 104 and 108 and can be sent periodically to mobile server 110 in larger blocks.

As mentioned above, the disclosed embodiments can also analyze user-interaction data for desktop UIs. For example, desktop systems 114 and 118, which are operated by users 112 and 116, respectively, can periodically transmit user-interaction data to desktop server 120, and desktop server 120 can forward this user-interaction data to communications bus 124. This user-interaction data from desktop systems 114 and 118 can similarly be stored in user-interaction data store 130 within storage device 128.

Note that communications bus 124, proxy 122 and storage device 128 can be located on one or more servers distributed across a network. Also, mobile server 110, desktop server 120, proxy 122, communications bus 124 and storage device 128 can be hosted in a virtualized cloud-computing system.

User-interaction data from user-interaction data store 130 feeds into a UI analysis tool 132, which generates and displays information about user interactions with a mobile UI (e.g., success rates for tap attempts). Note that UI analysis tool 132 can be implemented as a web client. UI analysis tool 132 is described in more detail below, but first we describe an exemplary mobile device.

Mobile Device

Figure 2:
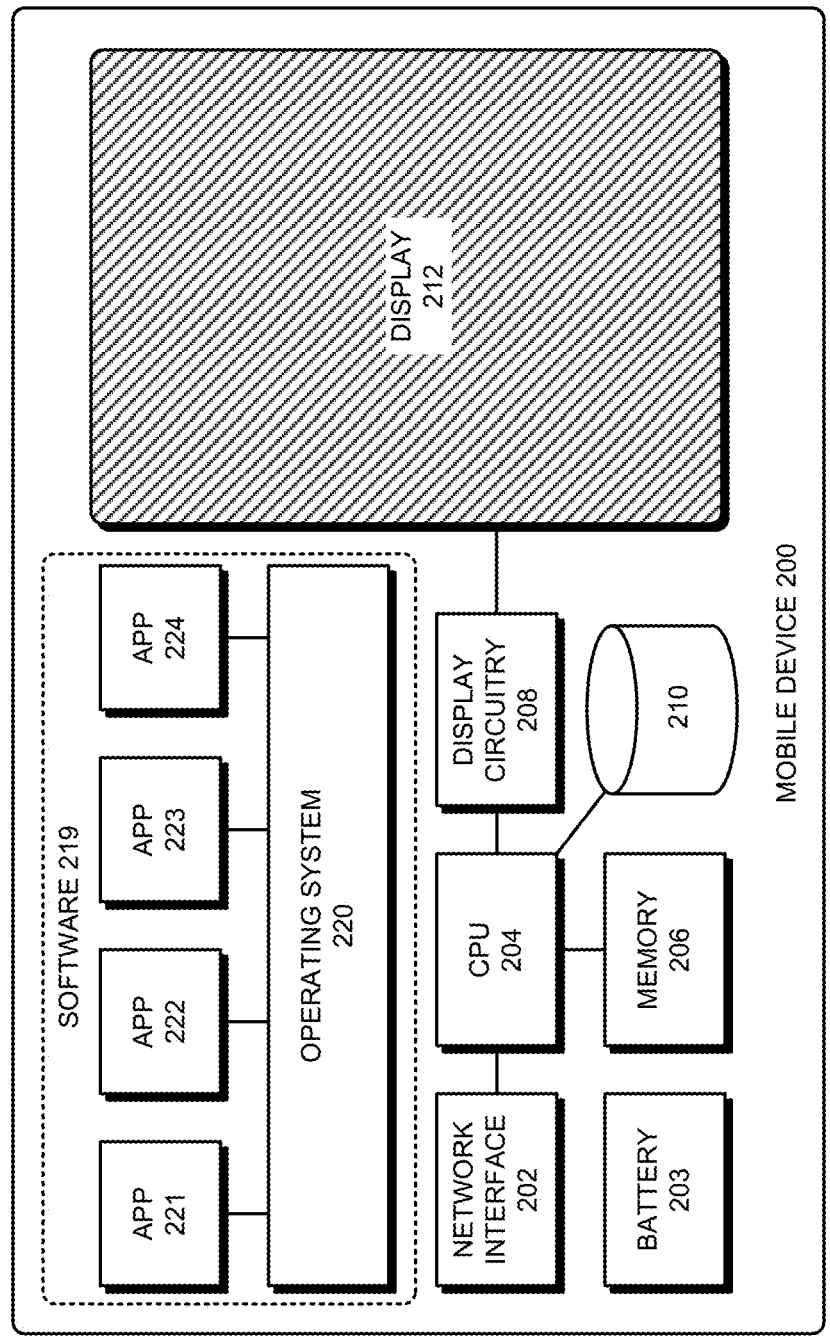
FIG. 2 illustrates a mobile device in accordance with the disclosed embodiments.

FIG. 2 illustrates the internal structure of an exemplary mobile device 200 in accordance with the disclosed embodiments. Mobile device 200 includes a number of hardware components, including a network interface 202, a battery 203, a central-processing unit (CPU) 204, a memory 206, a non-volatile storage device 210, display circuitry 208, and a display 212. Network interface 202 can include any type of circuitry for interfacing with a network, such as a Wi-Fi® network, a 3G or 4G data network, a Bluetooth™ network, or generally any type of wireless or wired communication network. Battery 203 can generally include any type of rechargeable (or non-rechargeable battery) that is used to power mobile device 200. CPU 204 can generally include any type of single-core or multi-core processing engine. Memory 206 can generally include any type of random-access memory that can store code and data to be used or manipulated by CPU 204. Display circuitry 208 can generally include any type of graphics-processing and amplification circuitry for driving display 212. Finally, display 212 can include any type of display that can be incorporated into mobile device 200, such as the touchscreen display for a smartphone or a tablet computer.

Mobile device 200 also includes various software components 219, including an operating system 220, which can be used to execute various mobile applications 221-224. For example, these mobile applications possibly output various types of user-interaction data as is described in more detail below. Furthermore, the operating system can include the Android™ operating system distributed by Google, Inc. of Mountain View, Calif.; the iOS™ operating system distributed by Apple Inc. of Cupertino, Calif.; the Windows Phone™ operating system distributed by Microsoft Corporation of Redmond, Wash.; or the BlackBerry OS™ distributed by BlackBerry Ltd. of Waterloo, Ontario, Canada. Moreover, mobile applications 221-224 can include mobile applications that can run on the Android™, iOS™, Windows Phone™ or BlackBerry OS™ operating systems.

Collecting User-Interaction Data

Figure 3:
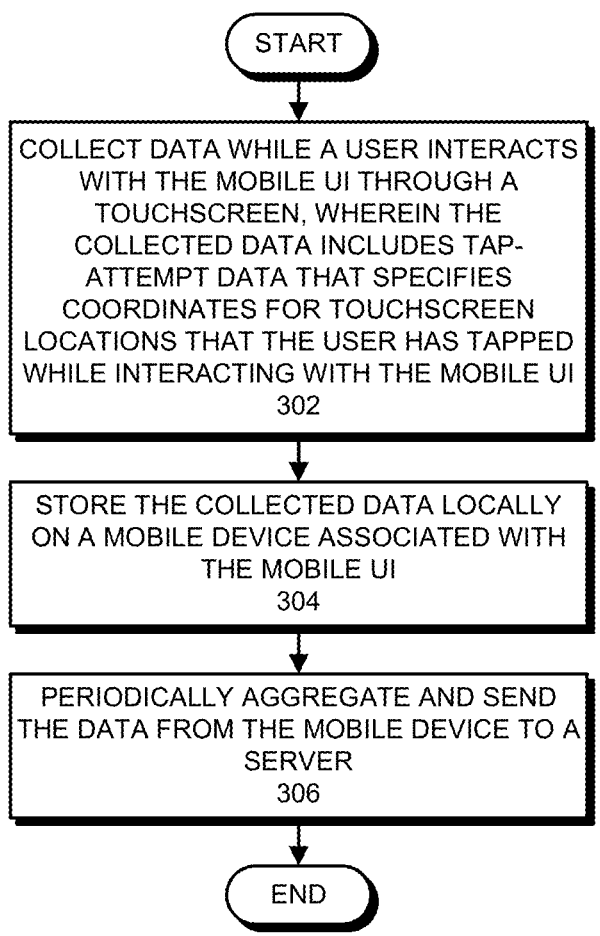
FIG. 3 presents a flow chart illustrating the process of collecting user-interaction data in accordance with the disclosed embodiments.

FIG. 3 presents a flow chart illustrating the process of collecting user-interaction data in accordance with the disclosed embodiments. During operation, the system collects user-interaction data while a user interacts with the mobile UI through a touchscreen (step 302). For example, the collected user-interaction data can include tap-attempt data that specifies coordinates for touchscreen locations that the user has tapped while interacting with the mobile UI. The user-interaction data can additionally include user-interaction data for other types of gestures, such as swipes. The collected data can also include scroll position information for UIs that have a scrolling screen. Note that a mobile operating system, such as iOS 7™, which is distributed by Apple Inc. of Cupertino, Calif., typically provides an application programming interface (API) that outputs screen coordinates for touch locations on a touchscreen of a mobile device. To facilitate detecting gestures such as swipes, the API can output coordinates for a "touch down" location and an associated "touch up" location for each user interaction.

Next, the system stores the collected data locally on a mobile device associated with the mobile UI (step 304). For example, the collected data can be stored in a temporary cache or a local file in the mobile device. Moreover, these storage operations can be performed using a background process so that the data collection process does not interfere with other applications on the mobile device. Then, the system periodically aggregates and sends the collected data from the mobile device to a server, such a mobile server 110, which stores the collected data in a storage device 128 (step 306). For example, this aggregation and sending process can take place once a week.

The same collection process can also take place for a desktop UI in a desktop computer system 114. However, instead of collecting information about the coordinates of touch locations on a touchscreen, the system can collect information about specific cursor locations when an associated pointing device button (e.g., mouse button) is depressed. In this way, the system can similarly collect information about how frequently specific UI elements are selected.

Analyzing Tap Attempts

Figure 4:
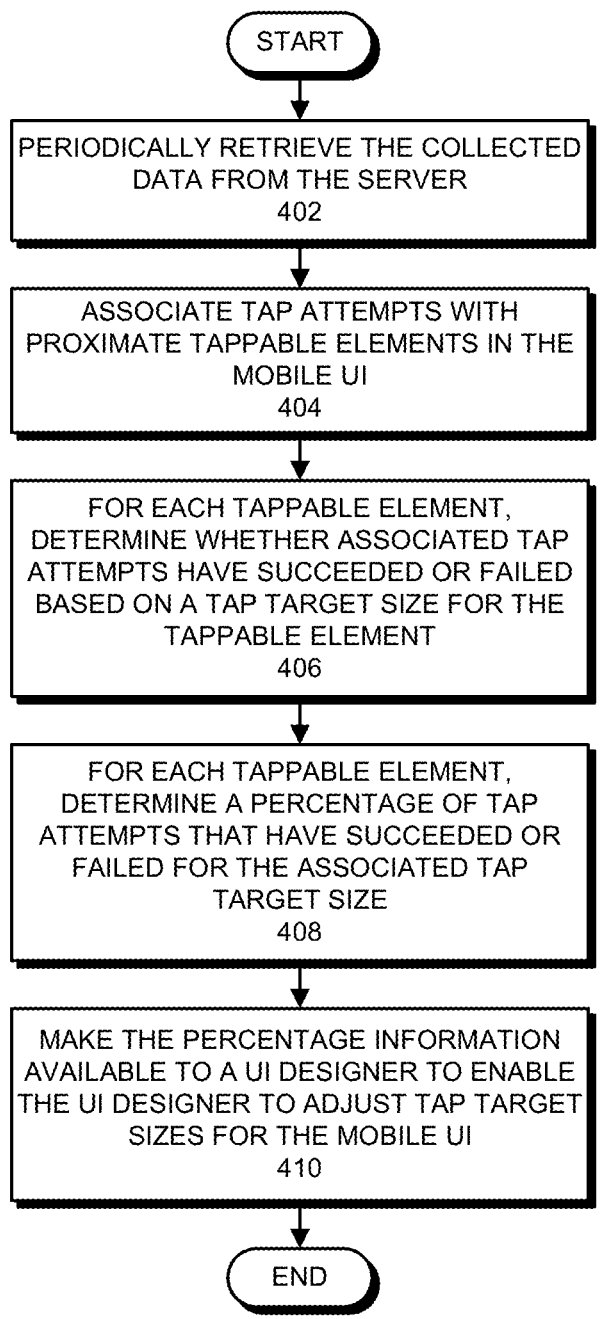
FIG. 4 presents a flow chart illustrating the process of analyzing tap attempts directed to tappable UI elements in accordance with the disclosed embodiments.

FIG. 4 presents a flow chart illustrating the process of analyzing tap attempts directed to tappable UI elements in accordance with the disclosed embodiments. In some embodiments, this process is performed by a UI analysis tool 132 that is implemented as a web client. In other embodiments, parts of this process are performed at a server that stores the user-interaction data, and other parts of the process are performed by the UI analysis tool 132.

During operation, the system periodically retrieves user-interaction data from a server (step 402). For example, in the system illustrated in FIG. 1, UI analysis tool 132 periodically retrieves data from user-interaction data store 130 in storage device 128.

Next, the system associates tap attempts with proximate tappable elements in the mobile UI (step 404). In some embodiments, the server stores metadata for each page of the mobile UI, wherein the metadata for a given page includes metadata associated with each tappable element in the given page. The metadata for each tappable element can include: (1) an identifier for the tappable element; (2) a screen position of the tappable element; (3) a current tap target size for the tappable element; and (4) a screen image for the tappable element. This metadata for tappable elements can be used to associate each tap attempt with a proximate tappable element, or possibly with a proximate non-tappable element as is described in more detail below. This association can be based on proximity. Hence, if a tap attempt falls within a threshold distance of a UI element it will be associated with the UI element.

Then, for each tappable element, the system determines whether the associated tap attempts have succeeded or failed based on the tap target size for the tappable element (step 406). This involves simply determining whether each tap attempt falls within the borders of the tap target or not. Next, for each tappable element, the system uses results of the comparison to determine a percentage of tap attempts that have succeeded or failed for the associated tap target size (step 408). Finally, the system makes the percentage information available to a UI designer 134 to enable the UI designer 134 to adjust tap target sizes for the mobile UI (step 410).

Tap Attempts Directed to Non-Tappable UI Elements

Figure 5:
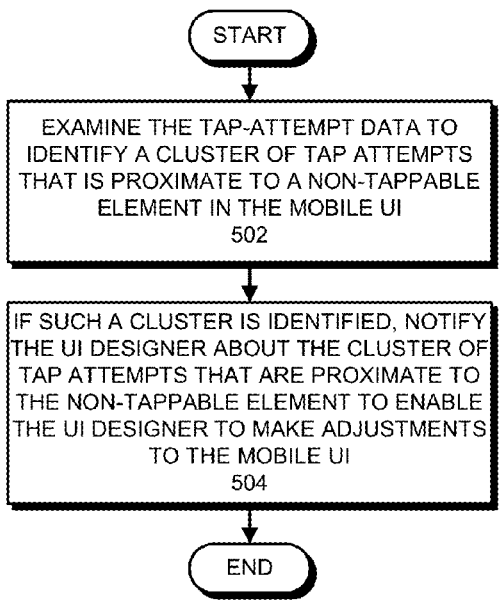
FIG. 5 presents a flow chart illustrating the process of analyzing tap attempts directed to a non-tappable UI element in accordance with the disclosed embodiments.

FIG. 5 presents a flow chart illustrating the process of analyzing tap attempts directed to a non-tappable UI element in accordance with the disclosed embodiments. Such tap attempts indicate that the UI is not performing as the user expects it to, which creates friction during the user's experience and thereby degrades the user's satisfaction with the UI.

At the start of this process, the system examines the tap-attempt data to identify a cluster of tap attempts that are proximate to a non-tappable element in the mobile UI (step 502). For example, the system can look to see if a group of tap attempts is within a threshold distance of a non-tappable element. If such a cluster is identified, the system notifies the designer about the cluster of tap attempts that are proximate to the non-tappable element (step 504). This enables the UI designer to make corrective adjustments to the mobile UI. For example, the UI designer can change the appearance of the non-tappable element to more clearly indicate that the non-tappable element is not tappable. This can involve changing the size, color or appearance of the non-tappable element. Alternatively, the UI designer can make the non-tappable element tappable if there is a function that users are expecting the non-tappable element to activate.

Analyzing Swipe Attempts

Figure 6:
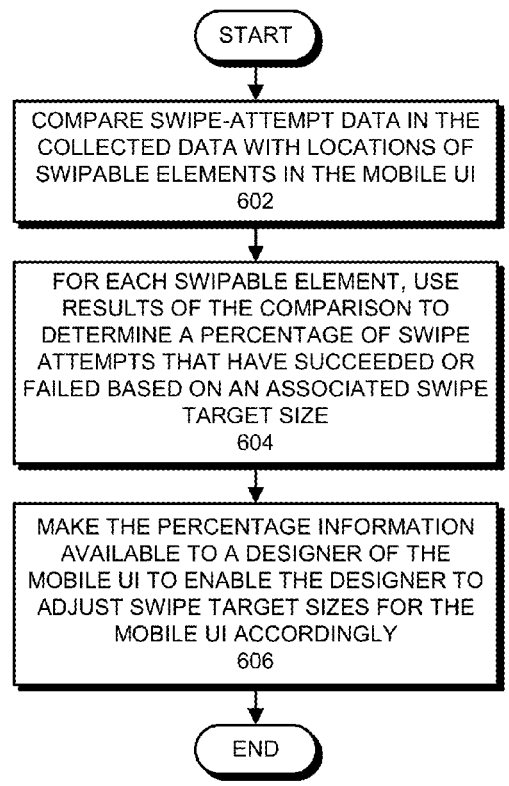
FIG. 6 presents a flow chart illustrating the process of analyzing swipe attempts directed to swipable UI elements in accordance with the disclosed embodiments.

FIG. 6 presents a flow chart illustrating the process of analyzing swipe attempts directed to swipable UI elements in a mobile UI in accordance with the disclosed embodiments. This process is similar to the process of analyzing tap attempts, except that a swipe gesture is associated with two locations, including a "touch down" location and a corresponding "touch up" location.

At the start of this process, the system compares swipe-attempt data with locations of swipable elements in the mobile UI (step 602). Next, for each swipable element, the system uses results of the comparison to determine a percentage of swipe attempts that have succeeded or failed for the associated swipe target size (step 604). Finally, the system makes this percentage information available to a UI designer to enable the UI designer to adjust swipe target sizes for the mobile UI accordingly (step 606).

Note that the above-described process can generally be applied to any type of user gesture and is not meant to be limited to swipe attempts or tap attempts.

Exemplary UI

FIG. 7 illustrates an exemplary mobile UI including associated tap attempts and swipe attempts in accordance with the disclosed embodiments. The mobile UI that appears on the right-hand side of FIG. 7 includes a number of tappable elements, which are labeled "Apple," "Mango," "Easy," "Medium" and "Hard." It also includes a swipable element in the form of a slider labeled "Finish the session." It additionally includes two non-tappable elements labeled "Cat" and "Dog."

The UI that appears on the left-hand side of FIG. 7 is the same as the UI on the right-hand-side of FIG. 7, except that tap-attempt and swipe-attempt data has been overlaid on top of the UI. In particular, the green dots represent touch down locations for successful tap attempts (assuming a given tap target size) and the red dots represent touch down locations for unsuccessful tap attempts. Moreover, the blue lines connect touch down locations with associated touch up locations for swipe gestures. The tappable elements are associated with a number of successful tap attempts as indicated by the green dots, and a number of unsuccessful tap attempts as indicated by the surrounding red dots. Moreover, the slider is associated with a number of successful swipe attempts, which are indicated by red dots attached to blue lines.

The system can also make recommendations to the UI designer based on this data. For example, the system might say the following.

0% of tap attempts on blue_left failed due to small tap target size
25% of tap attempts on second failed due to small tap target size Fix it!
0% of tap attempts on blue_right failed due to small tap target size
29% of tap attempts on third failed due to small tap target size Fix it!
53% of tap attempts on first failed due to small tap target size Fix it!
98% of users performed swipe gesture on finish target Clicking on the "Fix it" link directs the user to a tap target sizing tool, which is described in more detail below.

Tap Target Sizing Tool

FIG. 8 illustrates a tap target sizing tool that allows a UI designer to try various tap target sizes in accordance with the disclosed embodiments. In this example, a tappable element labeled "Easy" is illustrated within a rectangle that indicates the borders of the associated tap target. The size of this associated tap target in pixels is displayed as "58×27" along with a failure rate of 39%. When a user activates the "plus" control, this causes the tap target size to increase and possibly causes the associated failure rate to decrease. In contrast, when the user activates the "minus" control, this causes the tap target size to decrease and possibly causes the associated failure rate to increase.

The foregoing descriptions of disclosed embodiments have been presented only for purposes of illustration and description. They are not intended to be exhaustive or to limit the disclosed embodiments to the forms disclosed. Accordingly, many modifications and variations will be apparent to practitioners skilled in the art. Additionally, the above disclosure is not intended to limit the disclosed embodiments. The scope of the disclosed embodiments is defined by the appended claims.

What is claimed is:

1. A computer-implemented method for tracking user interactions with a mobile user interface (UI), the method comprising:
   collecting data while a user interacts with the mobile UI through a touchscreen, wherein the collected data includes tap-attempt data that specifies coordinates for touchscreen locations that the user has tapped while interacting with the mobile UI;
   examining the tap-attempt data to identify a cluster of tap attempts that are proximate to a non-tappable element in the mobile UI; and
   when such a cluster is identified, notifying a UI designer about the cluster of tap attempts that are proximate to the non-tappable element, to enable the UI designer to make adjustments to the mobile UI;
   wherein the collected data additionally includes swipe-attempt data that specifies coordinates for a "touch down" location and an associated "touch up" location for each swipe attempt, and wherein the method further comprises:
   comparing the swipe-attempt data with locations of swipable elements in the mobile UI, wherein each swipable element has an associated swipe target size;
   for each swipable element, using results of the comparison to determine a percentage of swipe attempts that have succeeded or failed for the associated swipe target size; and
   making the percentage information available to the UI designer to enable the UI designer to adjust swipe target sizes for the mobile UI.

2. The computer-implemented method of claim 1, further comprising:
   changing an appearance of the non-tappable element to indicate that the non-tappable element is not tappable.

3. The computer-implemented method of claim 2, wherein changing the appearance of the non-tappable element comprises at least one of the following:
   changing a size of the non-tappable element; and
   changing a color of the non-tappable element.

4. The computer-implemented method of claim 1, further comprising:
   making the non-tappable element tappable upon determining that there is a function that users are expecting the non-tappable element to activate.

5. The computer-implemented method of claim 1, further comprising:
   comparing the tap-attempt data with locations of tappable elements in the mobile UI, wherein each tappable element has an associated tap target size;
   for each tappable element, using results of the comparison to determine a percentage of tap attempts that have succeeded or failed for the associated tap target size; and
   making the percentage information available to the UI designer to enable the UI designer to adjust tap target sizes for the mobile UI.

6. The computer-implemented method of claim 5, wherein comparing the tap-attempt data with the locations of the tappable elements includes:
   associating tap attempts with proximate tappable elements in the mobile UI; and
   for each tappable element, determining whether the associated tap attempts have succeeded or failed based on the tap target size for the tappable element.

7. The computer-implemented method of claim 1, wherein the collected data additionally includes gesture data associated with other user gestures in addition to the tap-attempt data and the swipe-attempt data.

8. Apparatus that tracks user interactions with a mobile user interface (UI), the apparatus comprising:
   one or more processors; and
   memory storing instructions that, when executed by the one or more processors, cause the apparatus to:
   collect data while a user interacts with the mobile UI through a touchscreen, wherein the collected data includes tap-attempt data that specifies coordinates for touchscreen locations that the user has tapped while interacting with the mobile UI;
   examine the tap-attempt data to identify a cluster of tap attempts that are proximate to a non-tappable element in the mobile UI; and
   when such a cluster is identified, notify a UI designer about the cluster of tap attempts that are proximate to the non-tappable element to enable the UI designer to make adjustments to the mobile UI;
   wherein the collected data additionally includes swipe-attempt data that specifies coordinates for a "touch down" location and an associated "touch UP" location for each swipe attempt, and wherein the instructions further cause the apparatus to:
   compare the swipe-attempt data with locations of swipable elements in the mobile UI, wherein each swipable element has an associated swipe target size;
   for each swipable element, use results of the comparison to determine a percentage of swipe attempts that have succeeded or failed for the associated swipe target size; and make the percentage information available to the UI designer to enable the UI designer to adjust swipe target sizes for the mobile UI.

9. The apparatus of claim 8, wherein the instructions, when executed by the one or more processors, further cause the apparatus to:
change an appearance of the non-tappable element to indicate that the non-tappable element is not tappable.

10. The apparatus of claim 9, wherein changing the appearance of the non-tappable element comprises at least one of the following:
changing a size of the non-tappable element; and
changing a color of the non-tappable element.

11. The apparatus of claim 8, wherein the instructions, when executed by the one or more processors, further cause the apparatus to:
make the non-tappable element tappable upon determining that there is a function that users are expecting the non-tappable element to activate.

12. The apparatus of claim 8, wherein the instructions, when executed by the one or more processors, further cause the apparatus to:
compare the tap-attempt data with locations of tappable elements in the mobile UI, wherein each tappable element has an associated tap target size, and
for each tappable element, use results of the comparison to determine a percentage of tap attempts that have succeeded or failed for the associated tap target size; and
display the percentage information to the UI designer to enable the UI designer to adjust tap target sizes for the mobile UI.

13. The apparatus of claim 8, wherein while comparing the tap-attempt data with locations of tappable elements in the mobile UI, the instructions further cause the apparatus to:
associate tap attempts with proximate tappable elements in the mobile UI; and
for each tappable element, determine whether the associated tap attempts have succeeded or failed based on the tap target size for the tappable element.

14. The apparatus of claim 8, wherein the collected data additionally includes gesture data associated with other user gestures in addition to the tap-attempt data and the swipe-attempt data.

15. A non-transitory computer-readable storage medium storing instructions that, when executed by a computing device cause the computing device to perform a method for tracking user interactions with a mobile user interface (UI), the method comprising:
collecting data while a user interacts with the mobile UI through a touchscreen, wherein the collected data includes tap-attempt data that specifies coordinates for touchscreen locations that the user has tapped while interacting with the mobile UI;
examining the tap-attempt data to identify a cluster of tap attempts that are proximate to a non-tappable element in the mobile UI; and
when such a cluster is identified, notifying a UI designer about the cluster of tap attempts that are proximate to the non-tappable element to enable the UI designer to make adjustments to the mobile UI;
wherein the collected data additionally includes swipe-attempt data that specifies coordinates for a "touch down" location and an associated "touch UP" location for each swipe attempt, and wherein the method further comprises:
comparing the swipe-attempt data with locations of swipable elements in the mobile UI, wherein each swipable element has an associated swipe target size;
for each swipable element, using results of the comparison to determine a percentage of swipe attempts that have succeeded or failed for the associated swipe target size; and
making the percentage information available to the UI designer to enable the UI designer to adjust swipe target sizes for the mobile UI.

16. The non-transitory computer-readable storage medium of claim 15, wherein the method further comprises:
comparing the tap-attempt data with locations of tappable elements in the mobile UI, wherein each tappable element has an associated tap target size;
for each tappable element, using results of the comparison to determine a percentage of tap attempts that have succeeded or failed for the associated tap target size; and
making the percentage information available to the UI designer to enable the UI designer to adjust tap target sizes for the mobile UI.

17. The non-transitory computer-readable storage medium of claim 16, wherein comparing the tap-attempt data with the locations of the tappable elements includes:
associating tap attempts with proximate tappable elements in the mobile UI; and
for each tappable element, determining whether the associated tap attempts have succeeded or failed based on the tap target size for the tappable element.

* * * * *